US012013651B2

(12) United States Patent
Uno et al.

(10) Patent No.: US 12,013,651 B2
(45) Date of Patent: Jun. 18, 2024

(54) IMAGE FORMING APPARATUS

(71) Applicant: KYOCERA Document Solutions Inc., Osaka (JP)

(72) Inventors: Koji Uno, Osaka (JP); Keisuke Oba, Osaka (JP); Yasuhiro Michishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/338,010

(22) Filed: Jun. 20, 2023

(65) Prior Publication Data

US 2023/0418191 A1 Dec. 28, 2023

(30) Foreign Application Priority Data

Jun. 23, 2022 (JP) ................................. 2022-100922

(51) Int. Cl.
*G03G 15/16* (2006.01)
*G03G 15/00* (2006.01)

(52) U.S. Cl.
CPC ..... *G03G 15/1675* (2013.01); *G03G 15/1685* (2013.01); *G03G 15/5054* (2013.01); *G03G 15/80* (2013.01); *G03G 2215/1614* (2013.01); *G03G 2215/1623* (2013.01)

(58) Field of Classification Search
CPC .................................................. G03G 15/1675
See application file for complete search history.

(56) References Cited

U.S. PATENT DOCUMENTS

2015/0153709 A1* 6/2015 Verheijen ............... G01N 27/00 324/71.1
2016/0077469 A1* 3/2016 Okura ................ G03G 15/1675 399/66
2017/0192376 A1 7/2017 Taira
2018/0275567 A1* 9/2018 Kashihara .......... G03G 15/5029
2023/0418205 A1* 12/2023 Uno ................... G03G 15/1605

FOREIGN PATENT DOCUMENTS

JP 2014-178707 A 9/2014
JP 2017-122750 A 7/2017

* cited by examiner

*Primary Examiner* — Carla J Therrien
(74) *Attorney, Agent, or Firm* — Stein IP, LLC

(57) ABSTRACT

An image forming apparatus includes an image carrying member, an intermediate transfer belt, a primary transfer roller, a first belt support roller, a secondary transfer roller, a second belt support roller, a current output portion, a current sensing portion, and a control portion. The current output portion passes across the secondary transfer roller a secondary transfer current as part of an output current. The current output portion and the second belt support roller are electrically connected together. The current sensing portion senses a leakage current passing from the first belt support roller via the intermediate transfer belt to the second belt support roller. The control portion sets the output current such that the secondary transfer current has a value given by subtracting a leakage current from the output current and keeps the voltage on the second belt support roller between −50 V and 50 V, inclusive.

5 Claims, 3 Drawing Sheets

IMAGE FORMING APPARATUS

INCORPORATION BY REFERENCE

This application is based upon and claims the benefit of priority from the corresponding Japanese Patent Application No. 2022-100922 filed on Jun. 23, 2022, the entire contents of which are hereby incorporated by reference.

BACKGROUND

The present disclosure relates to an image forming apparatus.

Some known image forming apparatuses employ, as a system for transferring a toner image to a sheet, an intermediate transfer system. Such an image forming apparatus includes an image carrying member, an intermediate transfer belt, a primary transfer roller, a first belt support roller, a secondary transfer roller, a second belt support roller, and a current output portion.

The image carrying member carries a toner image on its surface. The intermediate transfer belt is a rotatably supported endless belt and is arranged adjacent to the image carrying member. The primary transfer roller makes contact with the inner circumferential face of the intermediate transfer belt and is arranged so as to face the image carrying member across the intermediate transfer belt. Applying to the primary transfer roller a primary transfer voltage having a polarity opposite to that of toner permits the toner image carried on the photosensitive drum to be primarily transferred to the intermediate transfer belt.

The first belt support roller is rotatably supported at a position downstream of the primary transfer roller with respect to the rotation direction of the belt. The first belt support roller is in contact with the inner circumferential face of the intermediate transfer belt such that the intermediate transfer belt is stretched around the first belt support roller.

The secondary transfer roller faces the first belt support roller across the intermediate transfer belt. The secondary transfer roller secondarily transfers, with a secondary transfer current, the toner image primarily transferred to the intermediate transfer belt further to a sheet passing between the secondary transfer roller and the intermediate transfer belt.

The second belt support roller is rotatably supported at a position downstream of the primary transfer roller, upstream of the first belt support roller, with respect to the rotation direction of the intermediate transfer belt. The second belt support roller is in contact with the inner circumferential face of the intermediate transfer belt such that the intermediate transfer belt is stretched around the second belt support roller.

Here, the first and second belt support rollers in an image forming apparatus like the one described above are each connected to the ground. The current output portion applies to the secondary transfer roller a transfer voltage having the polarity opposite to that of toner to output the secondary transfer current. As a result, as described above, the toner image is secondarily transferred to the sheet.

Incidentally, the secondary transfer roller is provided in a part of the image forming apparatus near a sheet conveying passage. Near the sheet conveying passage is arranged an access cover for maintenance work such as jam handling in the sheet conveying passage and this place is close to a side face of the housing; thus, there is limited space for wiring. In addition, the transfer voltage is a comparatively high voltage; thus, when applying the transfer voltage at a position close to the side face of the housing, it is necessary to prevent atmospheric discharge to a metal member forming a frame portion of the housing by securing a creepage distance between the frame portion close to the side face of the housing and the secondary transfer roller. This may complicate the design of wiring for the output of the secondary transfer current.

In contrast, some other image forming apparatuses employ a configuration in which a current output portion applies to the first belt support roller a transfer voltage with the same polarity as toner to pass a transfer current across the secondary transfer roller.

The first belt support roller in such an image forming apparatus is not connected to the ground. In such an image forming apparatus, the secondary transfer roller and the second belt support roller may each be connected to the ground. It is easier, around the first belt support roller than around the secondary transfer roller, to secure a wiring space and also to secure a creepage distance between the frame portion and the first belt support roller.

SUMMARY

According to one aspect of the present disclosure, an image forming apparatus includes an image carrying member, an intermediate transfer belt, a primary transfer roller, a first belt support roller, a secondary transfer roller, a second belt support roller, a current output portion, and a control portion. The image carrying member carries a toner image on its surface. The intermediate transfer belt is arranged adjacent to the image carrying member, is rotatably supported, and is endless. The primary transfer roller is in contact with the inner circumferential face of the intermediate transfer belt and is arranged so as to face the image carrying member across the intermediate transfer belt. The primary transfer roller primarily transfers the toner image carried on the image carrying member to the intermediate transfer belt by applying a primary transfer voltage to the intermediate transfer belt. The first belt support roller is rotatably supported at a position downstream of the primary transfer roller with respect to the rotation direction of the intermediate transfer belt such that the intermediate transfer belt is stretched around the first belt support roller. The secondary transfer roller is connected to the ground. The secondary transfer roller faces the first belt support roller across the intermediate transfer belt and secondarily transfers the toner image to a sheet that passes between the secondary transfer roller and the intermediate transfer belt with a predetermined secondary transfer current. The second belt support roller is rotatably supported at a position downstream of the primary transfer roller, upstream of the first belt support roller, with respect to the rotation direction of the intermediate transfer belt. The second belt support roller makes contact with the inner circumferential face of the intermediate transfer belt. The current output portion is connected to the first belt support roller and passes across the secondary transfer roller the secondary transfer current as part of an output current that passes across the first belt support roller when an output voltage with the same polarity as the toner image is applied to it. The control portion controls the current output portion. The current output portion and the second belt support roller are electrically connected together. The image forming apparatus includes a current sensing portion that senses a leakage current passing from the first belt support roller via the intermediate transfer belt to the second belt support roller. The control portion sets the output current such that the secondary transfer current has a current value given by subtracting the leakage current from the output current and keeps the voltage on the second belt support roller within the range of −50 V or higher but 50 V or lower.

DETAILED DESCRIPTION

Figure 1:
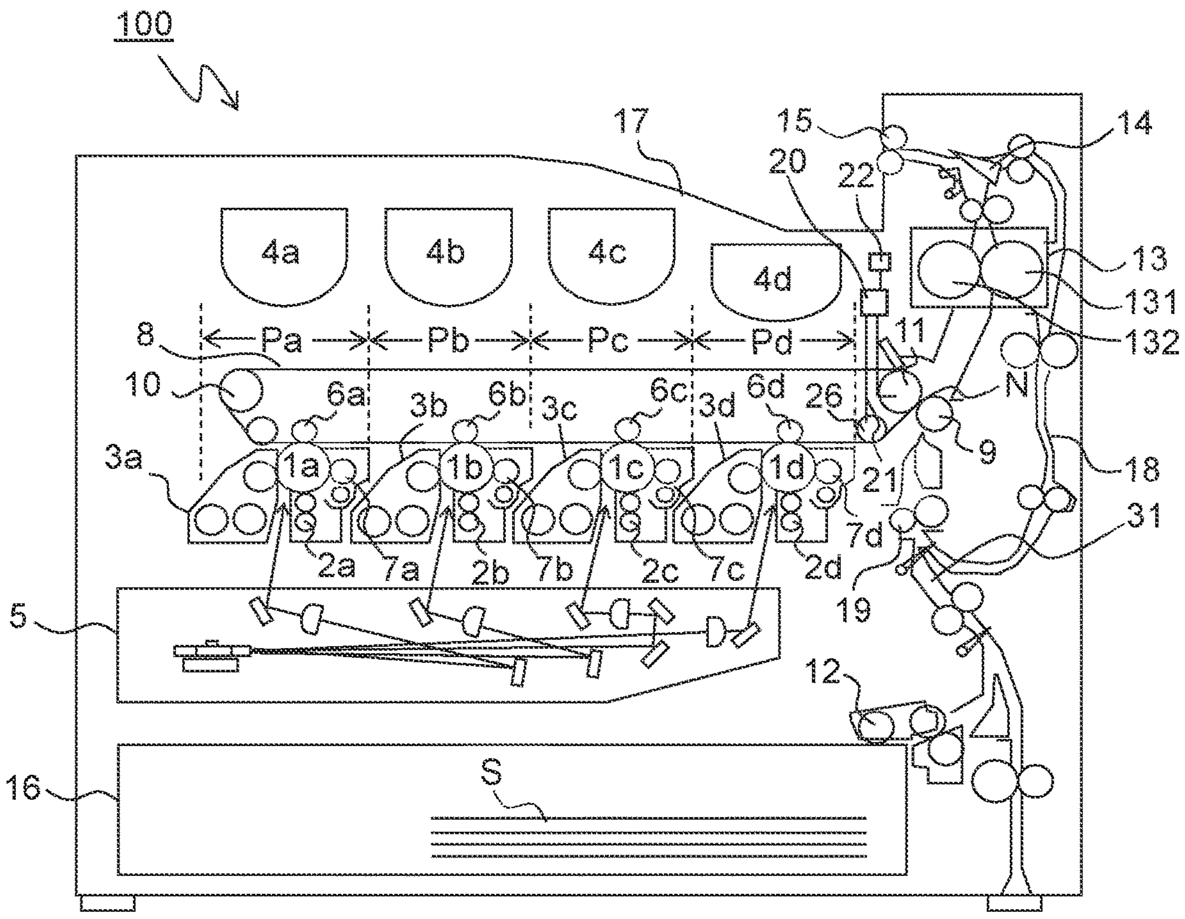
FIG. 1 is a schematic sectional view showing the internal structure of an image forming apparatus according to a first embodiment of the present disclosure.

Hereinafter, with reference to the accompanying drawings, a first embodiment of the present disclosure will be described. FIG. 1 is a schematic sectional view showing the internal construction of an image forming apparatus 100 according to the first embodiment of the present disclosure. First, the overall configuration of the image forming apparatus 100 will be described with reference to FIG. 1.

As shown in FIG. 1, in the main body of the image forming apparatus 100 (here, a color printer), four image forming portions, Pa, Pb, Pc and Pd are arranged in this order from the upstream side (left side in FIG. 1) in the conveying direction. These image forming portions Pa to Pd are provided so as to correspond to images of four different colors (cyan, magenta, yellow, and black) and sequentially form cyan, magenta, yellow, and black images each through the processes of electrostatic charging, exposure, development, and transfer.

In the image forming portions Pa to Pd, photosensitive drums 1*a* to 1*d* (image carrying members) are rotatably arranged. The photosensitive drums 1*a* to 1*d* carry visible images (toner images) of the different colors. The photosensitive drums 1*a* to 1*d* are connected to a main motor (not shown). The photosensitive drums 1*a* to 1*d* rotate in the clockwise direction in FIG. 1 with a rotative driving force from the main motor.

Provided around and under the photosensitive drums 1*a* to 1*d* are chargers 2*a* to 2*d*, an exposure device 5, developing devices 3*a* to 3*d*, and cleaning devices 7*a* to 7*d*.

The charging devices 2*a* to 2*d* electrostatically charge the photosensitive drums 1*a* to 1*d*. The exposure device 5 exposes the photosensitive drums 1*a* to 1*d* to light carrying image information. The developing devices 3*a* to 3*d* are loaded with predetermined amounts of two-component developer containing cyan, magenta, yellow, and black toner respectively.

The developing devices 3*a* to 3*d* form toner images on the photosensitive drums 1*a* to 1*d*. When the proportion of toner in the two-component developer stored in the developing devices 3*a* to 3*d* falls below a determined value, toner is supplied from toner containers 4*a* to 4*d* to the developing devices 3*a* to 3*d* respectively. The cleaning devices 7*a* to 7*d* remove developer (toner) left on the photosensitive drums 1*a* to 1*d*.

An intermediate transfer belt 8 is provided at a position adjacent to the image forming portions Pa to Pd. Used as the intermediate transfer belt 8 is a sheet of dielectric resin (a resin material containing electrically conductive carbon), and typically is a belt with no seams (seamless belt). The surface resistivity of the intermediate transfer belt 8 is 9.5 logΩ/sq or higher but 10.5 logΩ/sq or lower.

Inward of the intermediate transfer belt 8, there are arranged a driven roller 10, a driving roller 11 (first belt support roller), primary transfer rollers 6*a* to 6*d*, and a belt support roller 26 (second belt support roller).

The driven roller 10 and the driving roller 11 are arranged apart in the horizontal direction. The driven roller 10 and the driving roller 11 are rotatably supported. The driving roller 11 is connected to a belt drive motor (not shown) that outputs a rotative driving force.

The intermediate transfer belt 8 is wound around the driven roller 10 on the upstream side and the driving roller 11 on the downstream side. As the driving roller 11 rotates with the rotative driving force from the drive motor, the intermediate transfer belt 8 rotates along the circumferential direction of the driving roller 11. The driven roller 10 rotates by following the intermediate transfer belt 8.

The intermediate transfer belt 8 is in contact with the photosensitive drums 1*a* to 1*d*. The primary transfer rollers 6*a* to 6*d* face the photosensitive drums 1*a* to 1*d* respectively across the intermediate transfer belt 8. The primary transfer rollers 6*a* to 6*d* apply electric fields to the intermediate transfer belt 8 with a predetermined transfer voltage between the primary transfer rollers 6*a* to 6*d* and the photosensitive drums 1*a* to 1*d*.

The belt support roller 26 is disposed downstream of the primary transfer roller 6*d*, upstream of the driving roller 11, in the rotation direction of the intermediate transfer belt 8. The belt support roller 26 is rotatably supported. The belt support roller 26 is kept in pressed contact with the inner circumferential face of the intermediate transfer belt 8 such that intermediate transfer belt 8 is stretched around the belt support roller 26.

The driving roller 11 faces the secondary transfer roller 9 across the intermediate transfer belt 8. The secondary transfer roller 9 and the intermediate transfer belt 8 form a secondary transfer nip between them.

In a lower part of the main body of the image forming apparatus 100, a sheet cassette 16 for storing sheets S (of a recording medium, such as printing sheets and OHP sheets) is provided. In a side part of the main body of the image forming apparatus 100, there are provided a sheet feeding roller 12, a main conveying passage 31, a pair of discharge rollers 15, a secondary transfer roller 9, a fixing device 13, and a pair of registration rollers 19.

The sheet feeding roller 12 is provided above the sheet cassette 16 and is in contact with the topmost sheet S in the sheet cassette 16. The main conveying passage 31 is a passage for conveyance of a sheet S and extends from the sheet feeding roller 12 toward the pair of discharge rollers 15 provided above the image forming apparatus 100. The sheet feeding roller 12 feeds to the main conveying passage 31 the sheets S inside the sheet cassette 16 one sheet after another.

The main conveying passage 31 branches, halfway along it, into a duplex conveyance path 18. The duplex conveyance path 18 extends downward from the branch point between the main conveying passage 31 and the duplex conveyance path 18 to eventually rejoin the main conveying passage 31. At the branch point, a branch portion 14 is provided. The branch portion 14 directs the sheet S in the main conveying passage 31 either to the pair of discharge rollers 15 or to the duplex conveyance path 18. The pair of discharge rollers 15 discharges the sheet S directed to it onto the discharge tray 17 formed in the top face of the image forming apparatus 100.

The secondary transfer roller 9 is arranged, with respect to the sheet conveying direction, upstream of the branch portion 14 in the main conveying passage 31, downstream of the point where the duplex conveyance path 18 rejoins the main conveying passage 31. The secondary transfer roller 9 faces the driving roller 11 across the intermediate transfer belt 8. The secondary transfer roller 9 and the intermediate transfer belt 8 form a secondary transfer nip N between them. The total resistivity of the secondary transfer roller 9 is 6.5 logΩ or higher but 8.5 logΩ or lower.

The secondary transfer roller 9 includes a metal shaft 32 and a laminated portion 33. The metal shaft 32 is a metal cylindrical member with a diameter of 8 to 16 mm. The laminated portion 33 is a layer with a thickness of 3 to 6 mm laid on the outer circumferential face of the metal shaft 32. The laminated portion 33 is formed of a foamed resin material formed by foaming an ion-conductive resin material, or a resin material containing electrically conductive carbon.

The pair of registration rollers 19 is located downstream of the point in the main conveying passage 31 where the main conveying passage 31 rejoins the duplex conveyance path 18. The pair of registration rollers 19 corrects a skew in a sheet S fed to the main conveying passage 31 and conveys the sheet S to the secondary transfer nip N mentioned above with predetermined timing.

Next, image formation on a sheet S will be described in detail. When image data is fed in from a host device such as a personal computer, first, the surfaces of the photosensitive drums 1*a* to 1*d* are electrostatically charged uniformly by the charging devices 2*a* to 2*d*. Next, the exposure device 5 irradiates the photosensitive drums 1*a* to 1*d* with light based on the image data to form on them electrostatic latent images. Then, the developing devices 3*a* to 3*d* feed toner onto the photosensitive drums 1*a* to 1*d*. With the toner electrostatically attaching to them, toner images corresponding to the electrostatic latent images are formed.

When the driving roller 11 is driven to rotate by the belt drive motor, with the rotation of the driving roller 11, the intermediate transfer belt 8 starts to rotate in the counter-clockwise direction in FIG. 1. As the intermediate transfer belt 8 rotates, the cyan, magenta, yellow, and black toner images formed on the photosensitive drums 1*a* to 1*d* are primarily transferred to the intermediate transfer belt 8 sequentially.

The toner and the like left on the surface of the photosensitive drums 1*a* to 1*d* after primary transfer are removed by the cleaning devices 7*a* to 7*d* in preparation for the subsequent formation of new electrostatic latent images.

Then, a sheet S is conveyed from the pair of registration rollers 19 toward the secondary transfer nip N with predetermined timing. The sheet S conveyed downstream by the pair of registration rollers 19 makes contact with the intermediate transfer belt 8 at the upstream side of the secondary transfer nip N. More specifically, the sheet S makes contact with the intermediate transfer belt 8 at a point between the driving roller 11 and the belt support roller 26 with respect to the rotation direction of the intermediate transfer belt 8. The sheet S is conveyed to the secondary transfer nip N while in contact with the intermediate transfer belt 8.

Here, when secondary transfer is performed, a voltage is fed to the driving roller 11 by a current output portion 20 (see FIG. 2), which will be described later, so that a secondary transfer current passes from the driving roller 11 to the secondary transfer roller 9. As a result of the sheet S being conveyed to the secondary transfer nip N while in contact with the intermediate transfer belt 8, the secondary transfer current a full-color image on the intermediate transfer belt 8 is secondarily transferred to the sheet S. The current output portion 20 will be described in detail later.

The sheet S having the toner images secondarily transferred to it is conveyed to the fixing device 13. The sheet S conveyed to the fixing device 13 is heated and pressed by a fixing roller 132 and a pressing roller 131. Then, the toner images are fixed to the surface of the sheet S, and thus the predetermined full-color image is formed on it. The sheet S having the full-color image formed on it has its conveying direction switched by the branch portion 14, which branches into a plurality of directions, and is then directly (or after being directed to the duplex conveyance path 18 to have images formed on both sides) discharged to a discharge tray 17 by a pair of discharge rollers 15.

Figure 2:
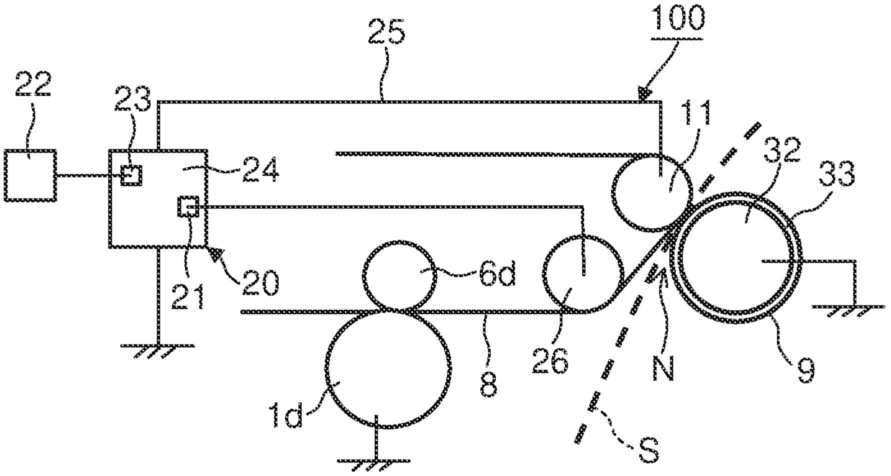
FIG. 2 is an enlarged view of and around an intermediate transfer belt and a current output portion.
Figure 3:
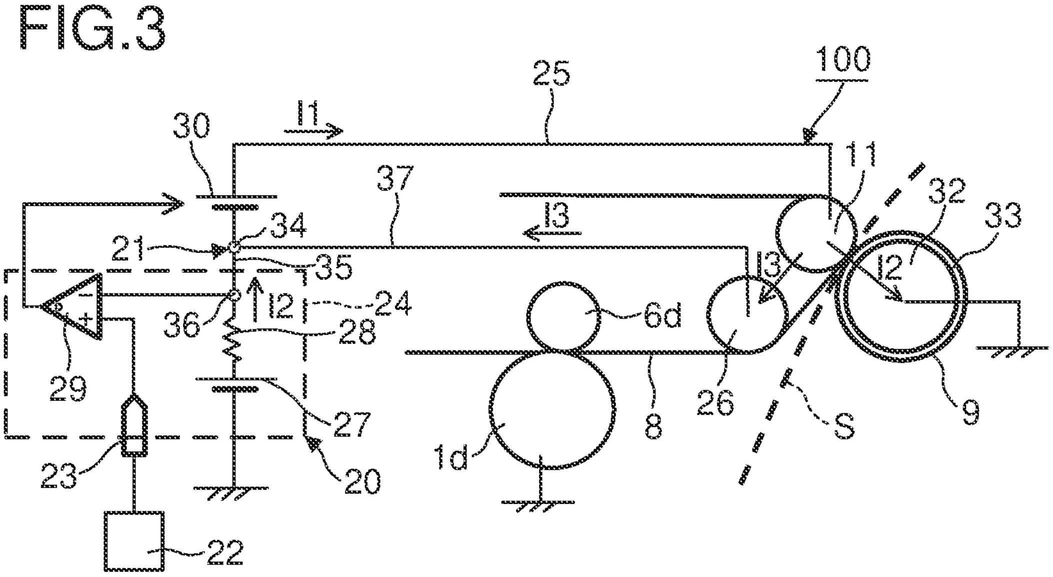
FIG. 3 is a diagram showing in detail the circuit configuration of the current output portion shown in FIG. 2.

Next, the configuration of a part of the image forming apparatus 100 related to secondary transfer will be described. FIG. 2 is an enlarged view of and around the intermediate transfer belt 8 and the current output portion 20. FIG. 3 is a diagram showing in detail the circuit configuration of the current output portion 20 shown in FIG. 2. As shown in FIG. 2, the image forming apparatus 100 includes, in addition to the current output portion 20 and other components described above, a current sensing portion 21 and a control portion 22.

The current output portion 20 includes a variable power supply portion 23, a constant current circuit 24, and an output path 25. The variable power supply portion 23 outputs a variable voltage. The variable voltage is a voltage that varies in accordance with the image data fed in. As the voltage value of the variable voltage, predetermined values suitable for secondary transfer are stored previously in the control portion 22 based on various values contained in the image data. The control portion 22 varies the variable voltage in accordance with the image data fed in.

The constant current circuit 24 is a circuit for generating an output current. To the constant current circuit 24, the variable power supply portion 23 is connected. The output path 25 is a conductor (lead wire) connected to the driving roller 11 and to the constant current circuit 24. The output current flows into the driving roller 11 via the output path 25. The circuit configuration of the constant current circuit 24 will be described in detail later.

The current sensing portion 21 is connected to the constant current circuit 24 and to the belt support roller 26 and senses a leakage current passing across the belt support roller 26. The control portion 22 is connected to the constant current circuit 24. The control portion 22 outputs a voltage value corresponding to a predetermined secondary transfer current. The control portion 22 sets the output current such that the secondary transfer current has the current value given by subtracting the leakage current from the output current.

Next, the configuration of the constant current circuit 24 will be described with reference to FIG. 3. The constant current circuit 24 is composed of a low-voltage power supply 27 (constant voltage power supply portion), a resistor 28, an operational amplifier 29, and a high-voltage power supply 30. The low-voltage power supply 27 is connected to the negative terminal (second terminal) of the operational amplifier 29 across the resistor 28 (constant voltage power supply portion).

To the positive terminal (first terminal) of the operational amplifier 29, the variable power supply portion 23 is connected. To the output terminal of the operational amplifier 29, a high-voltage power supply 30 is connected. The operational amplifier 29 adjusts the output of the high-voltage power supply 30 such that the difference between the voltage values at the positive and negative terminals is zero, that is, such that the voltage values at the positive and negative terminal are equal.

Of the output path 25 one terminal is connected to the driving roller 11 and the other terminal is connected to the high-voltage power supply 30.

The current sensing portion 21 is composed of the operational amplifier 29 mentioned above and a sensing path 37. Of the sensing path 37 one terminal is connected to the belt support roller 26 and the other terminal 34 (hereinafter referred to as the sensing terminal 34) is connected to a wiring path 35 that connects the high-voltage power supply 30 with the resistor 28.

The high-voltage power supply 30 outputs a voltage of 300 V or higher but 7000 V or lower. The output voltage of the low-voltage power supply 27 is lower than the output voltage of the high-voltage power supply 30. The voltage on the belt support roller 26 is set at −50 V or higher but 50 V or lower.

The control portion 22, when image data is fed in from a host device such as a PC, first, derives a suitable secondary transfer current I2 and a suitable variable voltage based on image data. Next, the high-voltage power supply 30 and the low-voltage power supply 27 each output a voltage, and the variable power supply portion 23 outputs a variable voltage.

Here, suppose that the output voltage of the variable power supply portion 23 is Vcount [V], that the output voltage of the low-voltage power supply 27 is Vref [V], and that the resistance value of the resistor 28 is R [Ω]; then, the current I2 passing through the resistor 28 is expressed by following formula (1).

$$I2=(V\mathrm{ref}-V\mathrm{cont})/R \qquad (1)$$

Here, the magnitude of the current that flows from a terminal 36 (the terminal of the resistor 28 on the operational amplifier 29 side) to the operational amplifier 29 is extremely low. Thus, the current that flows from the terminal 36 to the sensing terminal 34 has a current value substantially equal to I2. Here, the current passing at the terminal 36 equals the secondary transfer current.

When the variable voltage is output, the output current I1 flows into the driving roller 11 via the output path 25. Part of the output current I1 flows from the driving roller 11 into the secondary transfer roller 9 as the secondary transfer current I2. At the same time, the rest of the output current I1 flows from the driving roller 11 into the belt support roller 26 as a leakage current I3. The leakage current I3 flows into the sensing terminal 34 via the sensing path 37.

Also when the electrical load across the secondary transfer roller, the intermediate transfer belt 8, the sheet S, and the like changes, in the current output portion 20, the operational amplifier 29 adjusts the output voltage of the high-voltage power supply 30 so as to keep the current I2 constant.

Here, as described above, the current that passes at the terminal 36 is controlled to be equal to the secondary transfer current I2. Thus, the current value passing at the sensing terminal 34 is the sum of the current value of the secondary transfer current I2 and the current value of the leakage current I3. In other words, the value of the output current I1 is the sum of the secondary transfer current I2 and the leakage current I3. Even if the current value of the leakage current I3 changes, the current output portion 20 controls the high-voltage power supply 30 to control the value of the output current I1, and thus the current value of the secondary transfer current I2 can be kept constant.

In the image forming apparatus 100 according to the above embodiment, the current output portion 20 controls the output current such that the secondary transfer current set in the control portion 22 has a current value given by subtracting the leakage current from the output current. Thus, even when a leakage current appears, by increasing the current value of the output current as much as the leakage current, it is possible to prevent a drop in the secondary transfer current. The voltage of the belt support roller 26 is kept in the range of ~50 V or higher but 50 V or lower. Thus, the potential difference between the belt support roller 26 and the members around the belt support roller 26 is smaller, so that the toner image is less likely to move between the belt support roller 26 and the member around it.

Thus, it is possible to provide an image forming apparatus 100 which, while suppressing a drop in the secondary transfer current, makes toner less likely to move between the belt support roller 26 and the members around the belt support roller 26.

As described above, owing to the current output portion 20 being configured to include the constant current circuit 24 including the operational amplifier 29, the output current linearly changes in accordance with the leakage current. Thus, it is possible to control the output current more accurately.

As described above, the surface resistivity of the intermediate transfer belt 8 is 9.5 logΩ/sq or higher but 10.5 logΩ/sq or lower. This makes the application bias necessary for the secondary transfer current more suitable, and helps suppress image defects such as a partial image loss due to discharging and a transfer defect due to an insufficient transfer current.

As described above, the total resistivity of the secondary transfer roller 9 is 6.5 logΩ/sq or higher but 8.5 logΩ/sq or lower. This makes the application bias necessary for the secondary transfer current more suitable, and helps effectively suppress image defects due to discharging and an insufficient transfer current as mentioned above.

As descried above, the intermediate transfer belt 8 is formed of a dielectric resin (a resin material containing electrically conductive carbon). Furthermore, the laminated portion 33 is formed of a foamed resin material formed by foaming an ion-conductive resin material, or a resin material containing electrically conductive carbon. This makes the application bias necessary for the secondary transfer current more suitable, and helps effectively suppress image defects due to discharging and an insufficient transfer current as mentioned above.

The benefits of the present disclosure will now be described in more detail by way of practical examples.

Using an image forming apparatus 100 like the one shown in FIG. 1, a study was made on a suitable range of voltages in which toner does not attach to and soil a peripheral member.

A solid patch on the intermediate transfer belt 8, with an average electric charge of 30 [μC/g], an attached toner amount of 0.5 [mg/cm2], and an area ratio in the sheet conveying direction of 50%, was continuously printed on 1000 sheets. In this case, the amount of toner attached to a resin cover 41 (see FIG. 4) on a sheet-metal frame 40 (see FIG. 4) that formed the housing of the image forming apparatus 100 was compared while the voltage on the belt support roller 26 was changed, and the results were analyzed.

Figure 4:
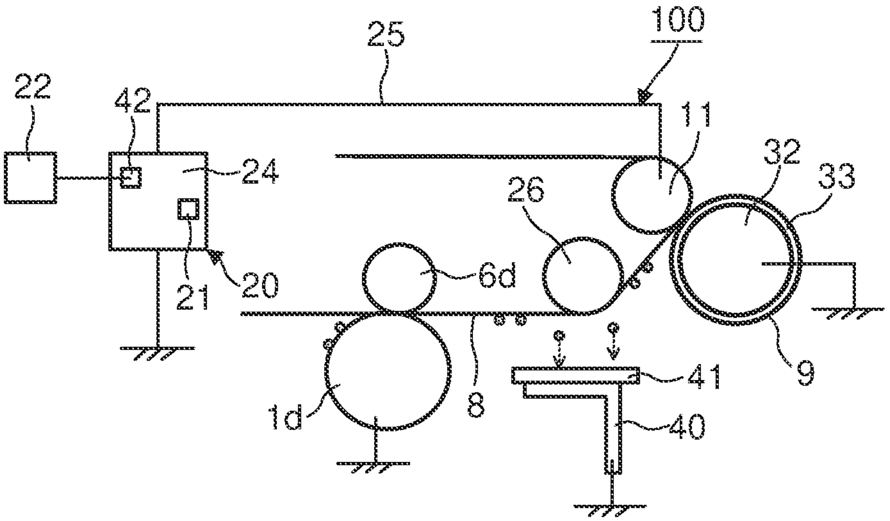
FIG. 4 is a schematic sectional view of and around the intermediate transfer belt in an image forming apparatus used to study the potential difference between a belt support roller and a resin cover.

Here, for this test, to the belt support roller 26 was connected, as shown in FIG. 4, a test voltage power supply 42 instead of the variable power supply portion 23 in the above embodiment. This test was aimed at checking for soiling with toner due to the potential difference between the belt support roller 26 and the peripheral members, and thus the sensing path 37 connecting the belt support roller 26 with the current output portion 20 was omitted.

The test voltage power supply 42 was able to change the output voltage (hereinafter referred to as the test voltage) within the range of ~500 V or higher but 500 V or lower. The resin cover 41 was located under the intermediate transfer belt 8. The resin cover 41 faced between the primary transfer roller 6*d* and the belt support roller 26 in the rotation direction of the intermediate transfer belt 8. No bias was applied to the resin cover 41 and thus the voltage on the resin cover 41 was 0 V. Thus, the value of the test voltage was substantially equal to the potential difference between the resin cover 41 and the belt support roller 26.

Continuous printing as mentioned above was performed with the test voltage changed in predetermined seven steps (see Table 1), and the soil on the resin cover 41 after the continuous printing was inspected. The results are shown in Table 1. In Table 1, "E" indicates no visible soil, "A" indicates slightly visible soil, and "F" indicates easily visible soil.

TABLE 1

| | Test Voltage [V] | | | | | | |
|---|---|---|---|---|---|---|---|
| | −500 | −100 | −50 | 0 | 50 | 100 | 500 |
| Dirt | F | A | E | E | E | A | F |

With the test voltage at −100 V or lower or +100 V or higher, the soil on the resin cover 41 was visible. With the test voltage lowered from −100 V to −500 V, the soil on the resin cover 41 worsened and was more easily visible. Likewise, with the test voltage raised from +100 V to +500 V, the soil on the resin cover 41 worsened. In other words, the larger the potential difference between the resin cover 41 and the belt support roller 26, the more the resin cover 41 is soiled with toner.

By contrast, with the test voltage at −50 V or higher but +50 V or lower, no soil was visible on the resin cover 41.

Thus, a smaller potential difference between a member (here, the resin cover 41) peripheral to the belt support roller 26 and the belt support roller 26 makes toner less likely to move to the peripheral member, and this helps prevent the peripheral member from being soiled with toner. It was confirmed that a preferred potential difference between the belt support roller 26 and a member (here, the resin cover 41) peripheral to the belt support roller 26 was −50 V or higher but +50 V or lower.

The present disclosure finds application in image forming apparatuses that include, between a primary transfer roller and a driving roller, a belt support roller around which an intermediate transfer belt is stretched and that employ, as an intermediate transfer system, one that achieves secondary transfer by applying to a driving roller a bias with the same polarity as the toner image transferred to the intermediate transfer belt. Based on the present disclosure, it is possible to pass a substantially constant secondary transfer current across a secondary transfer roller facing the driving roller even when a leakage current appears across the belt support roller, and this helps suppress image defects.

What is claimed is:

1. An image forming apparatus comprising:

an image carrying member that carries a toner image on a surface thereof;

an intermediate transfer belt that is endless and that is arranged adjacent to the image carrying member, the intermediate transfer belt being rotatably supported;

a primary transfer roller that makes contact with an inner circumferential face of the intermediate transfer belt, the primary transfer roller being arranged so as to face the image carrying member across the intermediate transfer belt, the primary transfer roller primarily transferring the toner image carried on the image carrying member to the intermediate transfer belt by applying a primary transfer voltage to the intermediate transfer belt;

a first belt support roller that is rotatably supported at a position downstream of the primary transfer roller with respect to a rotation direction of the intermediate transfer belt, the first belt support roller having the intermediate transfer belt stretched therearound;

a secondary transfer roller that faces the first belt support roller across the intermediate transfer belt, the secondary transfer roller secondarily transferring the toner image to a sheet that passes between the secondary transfer roller and the intermediate transfer belt with a predetermined secondary transfer current, the secondary transfer roller being connected to a ground;

a second belt support roller that is rotatably supported at a position downstream of the primary transfer roller, upstream of the first belt support roller, with respect to the rotation direction of the intermediate transfer belt, the second belt support roller making contact with the inner circumferential face of the intermediate transfer belt;

a current output portion that is connected to the first belt support roller, the current output portion passing across the secondary transfer roller the secondary transfer current as part of an output current that passes across the first belt support roller when an output voltage with a same polarity as the toner image is applied thereto; and a control portion that controls the current output portion, wherein the current output portion and the second belt support roller are electrically connected together, the image forming apparatus includes a current sensing portion that senses a leakage current passing from the first belt support roller via the intermediate transfer belt to the second belt support roller, and the control portion sets the output current such that the secondary transfer current has a current value given by subtracting the leakage current from the output current and keeps a voltage on the second belt support roller within a range of −50 V or higher but 50 V or lower.

2. The image forming apparatus according to claim 1, wherein the current output portion includes:

a variable power supply portion that outputs a variable voltage that varies in accordance with a value of the secondary transfer current;

a constant voltage power supply portion that outputs a predetermined constant voltage;

an operational amplifier having:

a first terminal to which the variable power supply portion is connected;

a second terminal to which the constant voltage power supply portion is connected; and an output terminal connected to the first belt support roller, the operational amplifier amplifying the output voltage such that a constant current determined by a difference between the variable voltage and the constant voltage passes across the first belt support roller; and a sensing path of which one terminal is connected to the second belt support roller and of which another terminal is connected to the second terminal, the sensing path sensing the leakage current, and the voltage on the second belt support roller equals a potential difference between the second terminal and the constant voltage.

3. The image forming apparatus according to claim 1, wherein a surface resistivity of the intermediate transfer belt is 9.5 logΩ/sq or higher but 10.5 logΩ/sq or lower, and a total resistivity of the secondary transfer roller is 6.5 logΩ/sq or higher but 8.5 logΩ/sq or lower.

4. The image forming apparatus according to claim 3, wherein the intermediate transfer belt is formed of a resin material containing electrically conductive carbon.

5. The image forming apparatus according to claim 4, wherein the secondary transfer roller has:

a metal shaft that is a metal cylindrical member; and a laminated portion that is laid on an outer circumferential face of the metal shaft, and the laminated portion is formed of a foamed resin material formed by foaming an ion-conductive resin material, or a resin material containing electrically conductive carbon.

* * * * *